(12) United States Patent
Chang (10) Patent No.: US 12,465,020 B2
(45) Date of Patent: Nov. 11, 2025

(54) CLICKER TRAINING RIDING CROP (71) Applicant: JONE SHOU INDUSTRIAL CO., LTD., Nantou County (TW)

(72) Inventor: Chih Shun Chang, Nantou County (TW)

(73) Assignee: JONE SHOU INDUSTRIAL CO., LTD., Nantou County (TW)

( * ) Notice: Subject to any disclaimer, the term of this patent is extended or adjusted under 35 U.S.C. 154(b) by 0 days.

(21) Appl. No.: 18/972,528

(22) Filed: Dec. 6, 2024

(65) Prior Publication Data
US 2025/0185627 A1  Jun. 12, 2025

(30) Foreign Application Priority Data
Dec. 8, 2023 (TW) ................. 112213472

(51) Int. Cl.
*A01K 15/02* (2006.01)

(52) U.S. Cl.
CPC .................. *A01K 15/02* (2013.01)

(58) Field of Classification Search
CPC ...... A01K 15/02; A01K 15/021; A01K 15/04; Y10S 119/905; Y10S 119/908; A63H 5/00; A63H 5/04
See application file for complete search history.

(56) References Cited

U.S. PATENT DOCUMENTS

| 2,497,457 | A | * | 2/1950 | Kucera | A63H 5/04 446/407 |
| 3,172,393 | A | * | 3/1965 | Keller | A01K 15/02 119/719 |
| 3,538,637 | A | * | 11/1970 | Smith | G10D 13/24 984/154 |
| 3,902,272 | A | * | 9/1975 | Molenaar | A63H 5/00 446/415 |
| 5,351,653 | A | * | 10/1994 | Marischen | A01K 15/021 119/905 |
| 2004/0134434 | A1 | * | 7/2004 | Kraft | A01K 5/0114 119/51.01 |

FOREIGN PATENT DOCUMENTS

GB      2396477 A  *  6/2004  .............. G10K 3/00

* cited by examiner

*Primary Examiner* — Trinh T Nguyen
(74) *Attorney, Agent, or Firm* — MUNCY, GEISSLER, OLDS & LOWE, P.C.

(57) ABSTRACT

A clicker training riding crop includes a handle. The handle has a mounting seat. An upper cover covers the mounting seat. An elastic plate is disposed in the upper cover. One end of the elastic plate is sandwiched between the upper cover and the mounting seat. A push-button is coupled to another end of the elastic plate and extends out of the upper cover. The elastic plate has a deformation region that is deformable and capable of emitting sound. A crop body is selectively connected to either end of the handle.

12 Claims, 9 Drawing Sheets

CLICKER TRAINING RIDING CROP

FIELD OF THE INVENTION

The present invention relates to an animal training implement, and more particularly to a clicker training riding crop.

BACKGROUND OF THE INVENTION

In general, a riding crop is an implement used in horse riding. The jockey gives commands to the horse through the sound produced in the whipping process for training the horse to perform a wanted behaviour, so the riding crop is very important to the jockey.

However, as people pay more attention to the issue of animal welfare, the training of horses by whipping them with a riding crop is controversial. In addition, the riding crop may be used in a forward or rearward direction for different occasions. For example, in more intense speed training, the jockey may hold the riding crop in the forward direction to achieve a fast and loud whip. In equestrian training or competitions, the jockey may hold the riding crop in the rearward direction to create an elegant image. However, different ways of holding the riding crop will result in different strokes and strengths and the sound of the whip will be significant different, so it will not be possible to give consistent commands. This is not conducive to the training of horses.

SUMMARY OF THE INVENTION

The primary object of the present invention is to provide a clicker training riding crop which has the ability to produce its own sound without the need to whip the horse. The user can hold the clicker training riding crop in the forward or rearward direction for producing the same training sound.

In order to achieve the above object, the present invention provides a clicker training riding crop, comprising a handle, a clicker assembly and a crop body.

The handle is in the form of a long rod having a first end opening and a second end opening at two opposite ends thereof. The first end opening and the second end opening each have a locking portion. The handle has a mounting seat close to the first end opening. A holding portion is disposed on top of the mounting seat.

The clicker assembly includes an upper cover configured to cover the mounting seat. An elastic plate is provided in the upper cover. One end of the elastic plate is sandwiched between the upper cover and the mounting seat. A push-button is coupled to another end of the elastic plate. The push-button extends out of the upper cover from an opening of the upper cover. The elastic plate has a deformation region that is deformable and capable of emitting sound. A peripheral edge of the deformation region rests against the holding portion.

A fitting member is disposed on one end of the crop body. The fitting member is lockable with the locking portion. The crop body is selectively connected to the locking portion of the first end opening or the second end opening through the fitting member.

DETAILED DESCRIPTION OF THE PREFERRED EMBODIMENTS

Embodiments of the present invention will now be described, by way of example only, with reference to the accompanying drawings.

Referring to FIG. 1 through FIG. 7, a clicker training riding crop according to a first embodiment of the present invention comprises a handle 1, a clicker assembly 2, a crop body 3, and an end cover 4.

The handle 1 is in the form of a long hollow rod having a first end opening 11 and a second end opening 12 at two opposite ends thereof in the axial direction. A locking portion 13 is annularly disposed on the outer wall of each of the first end opening 11 and the second end opening 12. The handle 1 has a mounting seat 14 close to the first end opening 11. A holding portion 15 in the form of a U-shaped rib is disposed on top of the mounting seat 14.

Figure 1:
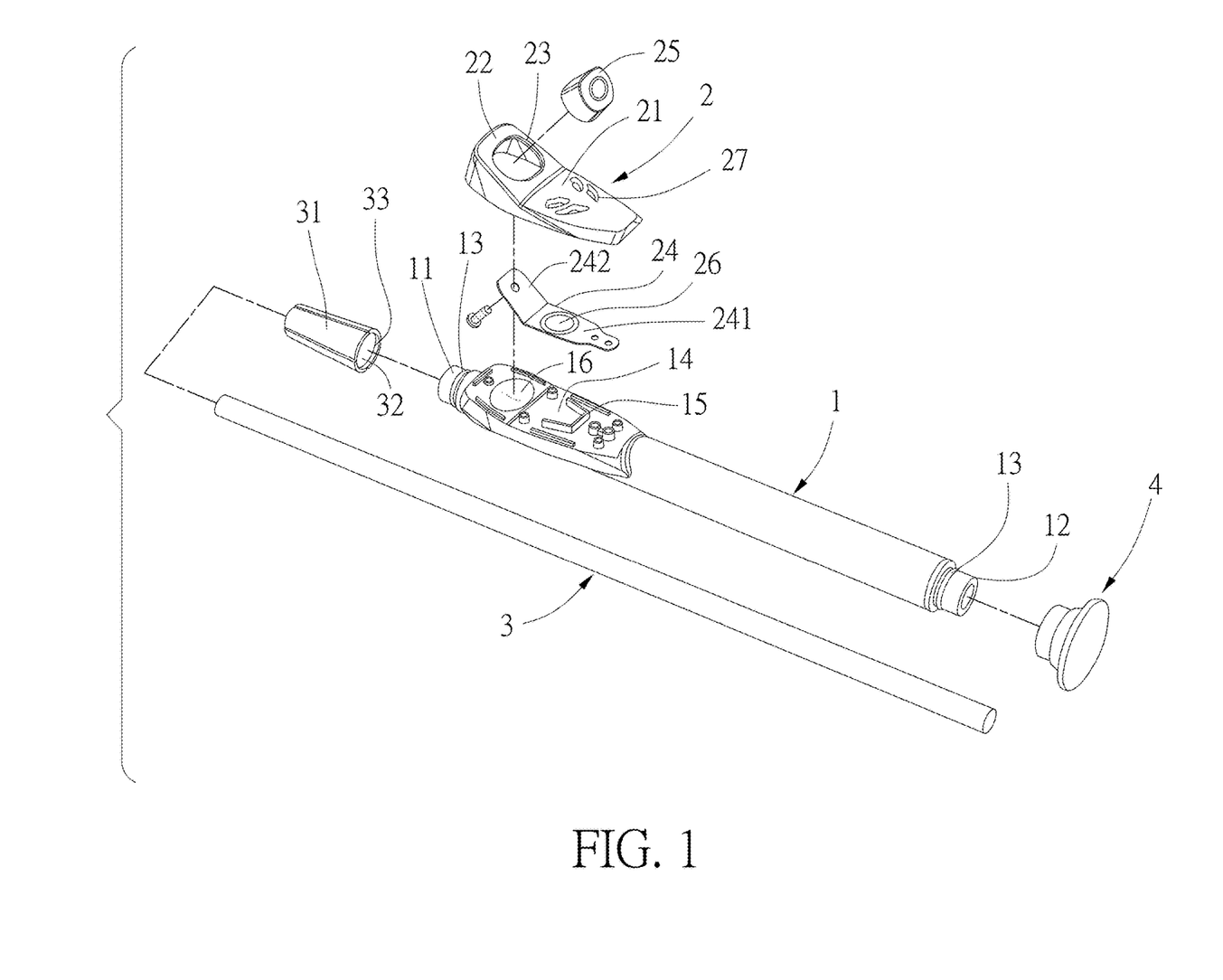
FIG. 1 is an exploded view of the present invention, wherein the crop body is to be connected to one end of the handle.
Figure 2:
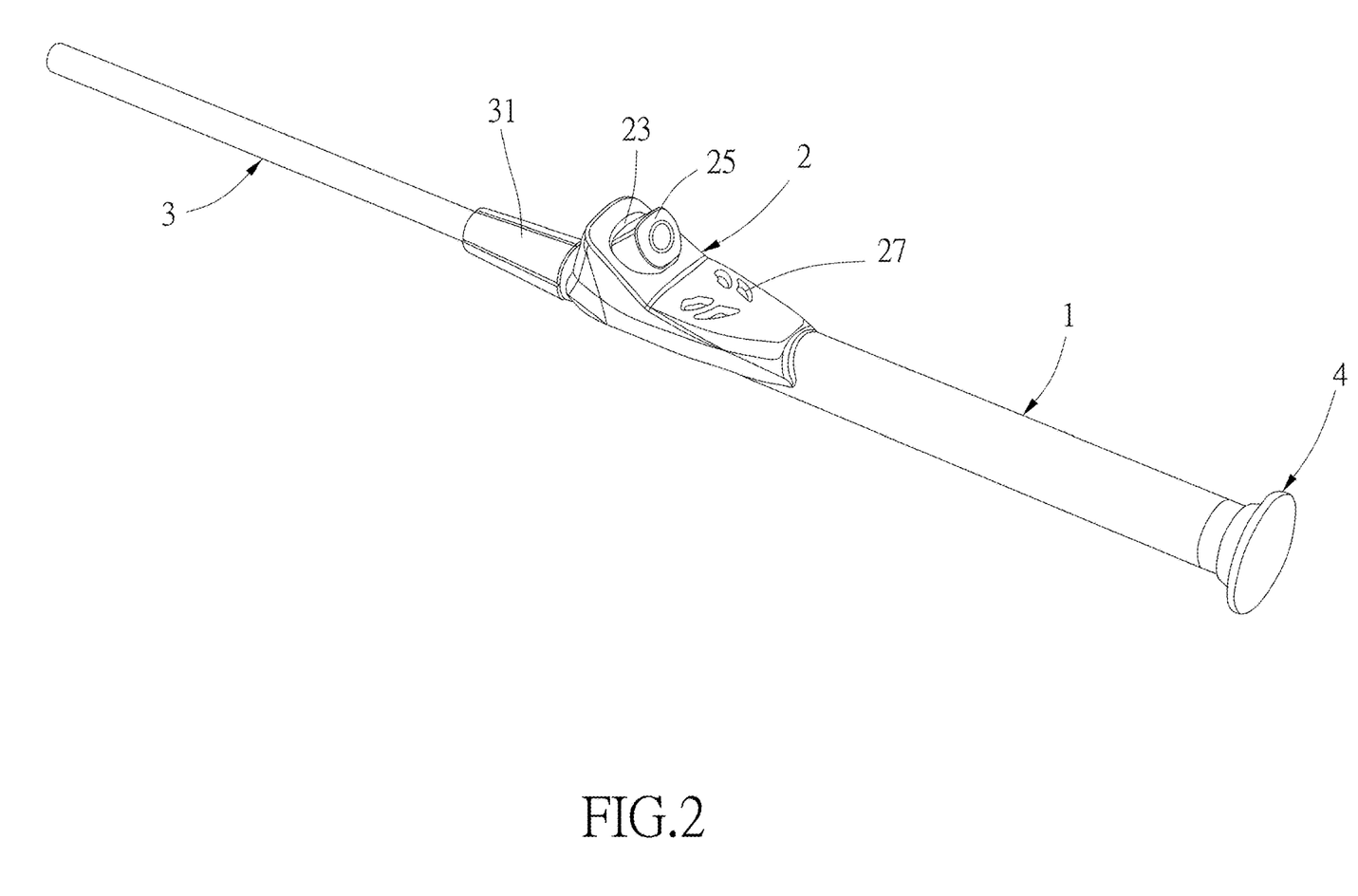
FIG. 2 is a perspective view of the present invention.
Figure 3:
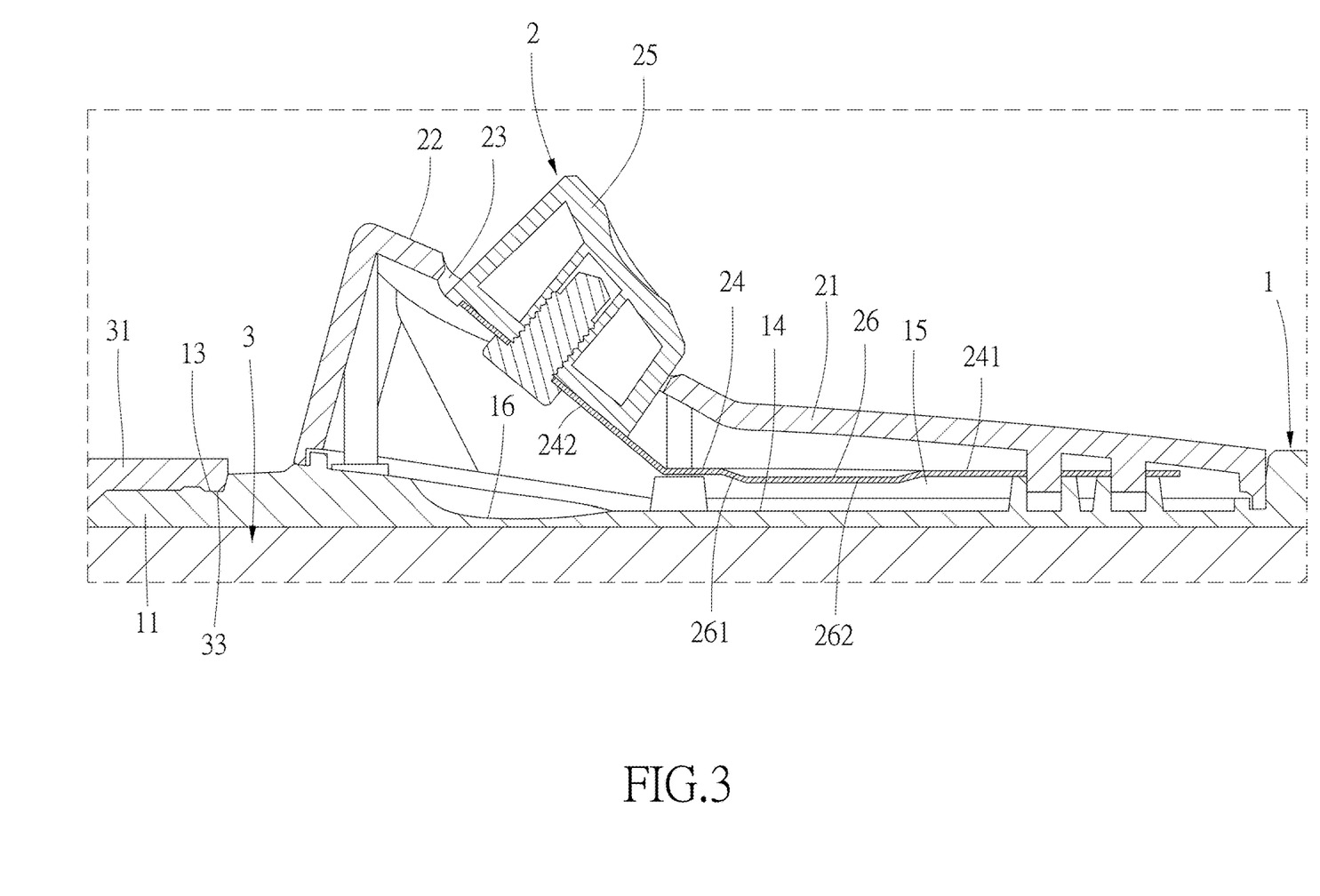
FIG. 3 is a lateral sectional schematic view of the present invention.
Figure 4:
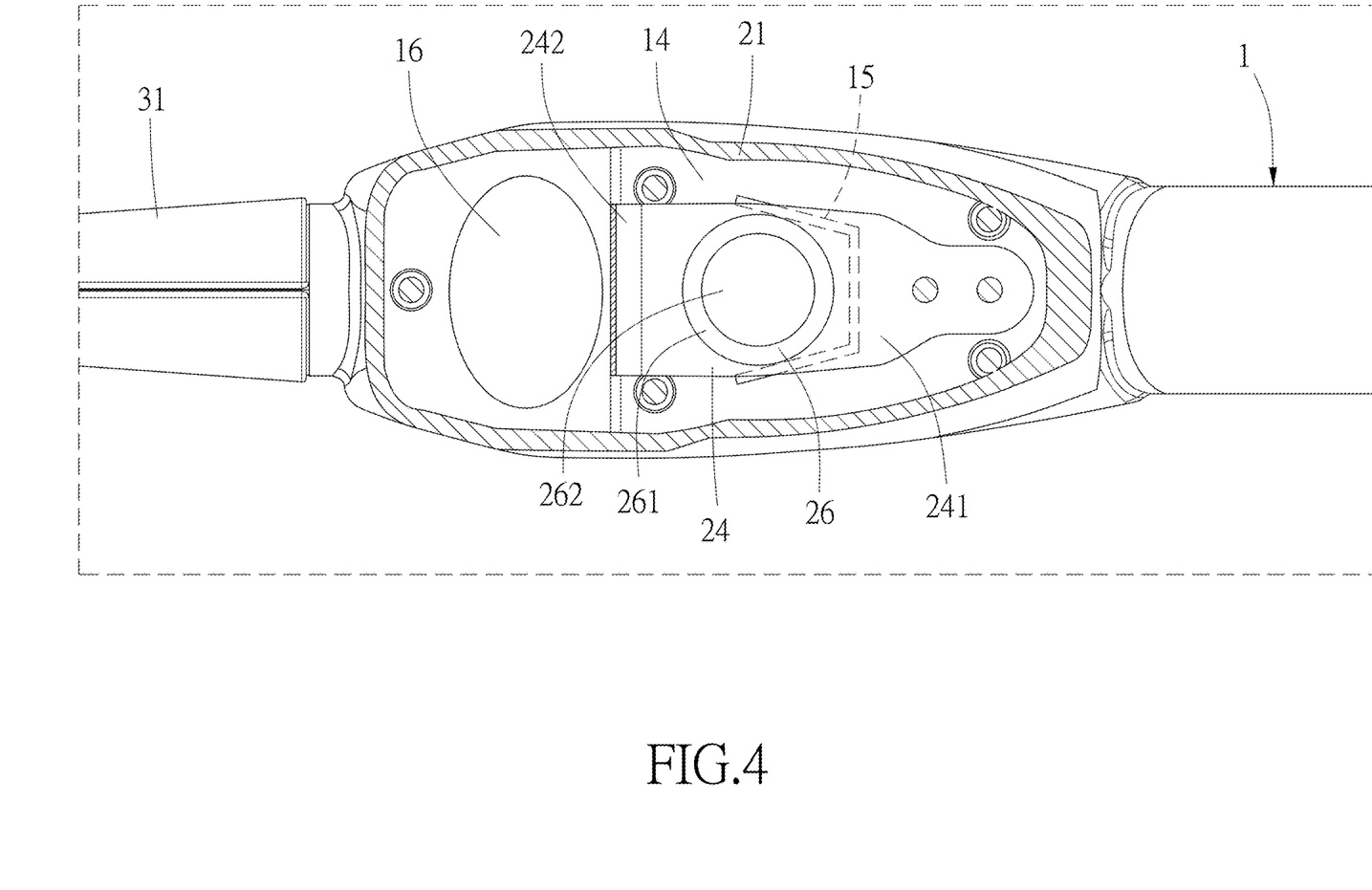
FIG. 4 is a top sectional schematic view of the present invention.

The clicker assembly 2 includes an upper cover 21 configured for covering the mounting seat 14. The upper cover 21 has a slope 22 located close to the first end opening 11 and extending upwardly toward the first end opening 11. An opening 23 is defined in the slope 22. A concave portion 16 is formed on the top of the mounting seat 14 corresponding in position to the opening 23, thereby increasing the internal space after the upper cover 21 covers the mounting seat 14. A thin elastic plate 24 is provided in the upper cover 21. The elastic plate 24 may be made of a metal or plastic material with resilient elasticity and is integrally formed by bending, such that the elastic plate 24 has a flat section 241 and an inclined section 242 extending upwardly relative to the flat section 241. The end of the flat section 241 is sandwiched between the upper cover 21 and the mounting seat 14. A push-button 25 is coupled to the end of the inclined section 242. The push-button 25 extends out of the slope 22 of the upper cover 21 from the opening 23 of the upper cover 21. The slope 22 of the upper cover 21 is configured in an ergonomic manner, allowing the user's thumb to press the push-button 25 with ease. A deformation region 26 that is deformable and capable of emitting sound is formed on the flat section 241. In this embodiment, the deformation region 26 has a first deformation portion 261 and a second deformation portion 262. The first and second deformation portions 261, 262 are concave downward relative to the flat section 241. Furthermore, the first and second deformation portions 261, 262 are circular. The diameter of the first deformation portion 261 is greater than the diameter of the second deformation portion 262. The first and second deformation portions 261, 262 are arranged concentrically.

A height difference is defined between the first and second deformation portions 261, 262. The first deformation portion 261 is gradually inclined downward. The bottom of the first deformation portion 261 is connected to the planar second deformation portion 262. The top of the upper cover 21 is formed with at least one sound hole 27 corresponding in position to the deformation region 26. The outer periphery of the deformation region 26 rests against the holding portion 15 in the form of a U-shaped rib. In this way, when the user presses the push-button 25 with his/her thumb, causing the elastic plate 24 to bend, the applied force is concentrated on the deformation region 26 to deform the deformation region 26 and to produce a crisp sound in the deformation and recovery process. In addition, the elevation angle of the inclined section 242 of the elastic plate 24 is greater than the elevation angle of the slope 22 of the upper cover 21. The push-button 25 extending out of the slope 22 from the opening 23 of the upper cover 21 is tapered, thereby improving the pressing feel and convenience. Moreover, the inclined section 242 with a greater inclination angle enables the elastic plate 24 to produce a greater deformation during bending. When the push-button 25 is pressed, the deformation region 26 is more likely to undergo sufficient deformation to make a clear sound.

The crop body 3 is in the form of a long stick. The crop body 3 includes a fitting member 31 at one end thereof. The fitting member 31 is in the form of a fitting sleeve. The fitting member 31 has a fitting opening 32. The crop body 3 is inserted in the fitting member 31 via the fitting opening 32. A first retaining portion 33 is disposed on the inner edge of the fitting opening 32 corresponding to the locking portion 13. The first retaining portion 33 is in snap-fit with the locking portion 13. The crop body 3 is selectively connected to the locking portion 13 of the first end opening 11 or the second end opening 12 through the fitting member 31. One end of the crop body 3, facing the handle 1, is inserted into the interior of the handle 1. By inserting one end of the crop body 3 into the handle 1, the stability of the connection of the crop body 3 can be enhanced.

The end cap 4 has a cap opening 41. A second retaining portion 42 (referring to FIG. 6) is disposed on the inner edge of the cap opening 41 corresponding to the locking portion 13. The second retaining portion 42 is in snap-fit with the locking portion 13. The end opening that is not connected to the fitting member 31 of the crop body 3 can be closed by the end cap 4.

Figure 5:
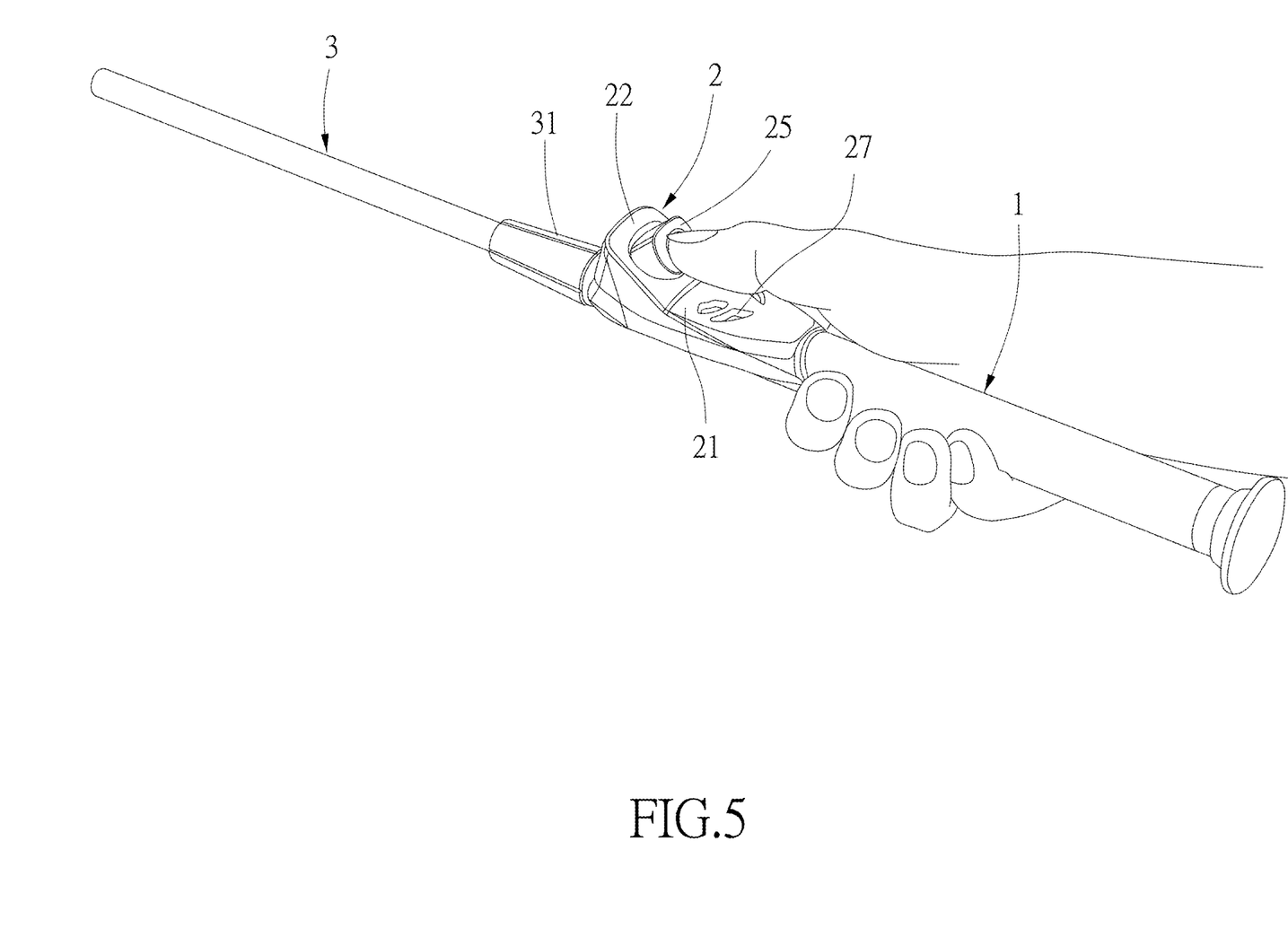
FIG. 5 is a schematic view of the present invention when in use, illustrating that the user holds the clicker training riding crop in the forward direction.

In actual use, as shown in FIG. 5, when the fitting member 31 of the crop body 3 is selectively connected to the first end opening 11 of the handle 1 and the second end opening 12 is covered by the end cap 4, the user holds the clicker training riding crop in the forward direction. In this use mode, the user holds the handle 1 with his/her palm, and her/his thumb faces the direction of the first end opening 11 to directly press the push-button 25 for the elastic plate 24 to deform and produce a sound, instead of the training sound produced in a traditional whipping manner. The clicker training riding crop achieves the same purpose of giving commands to the horse without harming the horse and has the advantage of saving effort so that the jockey can concentrate more on the riding action.

Figure 6:
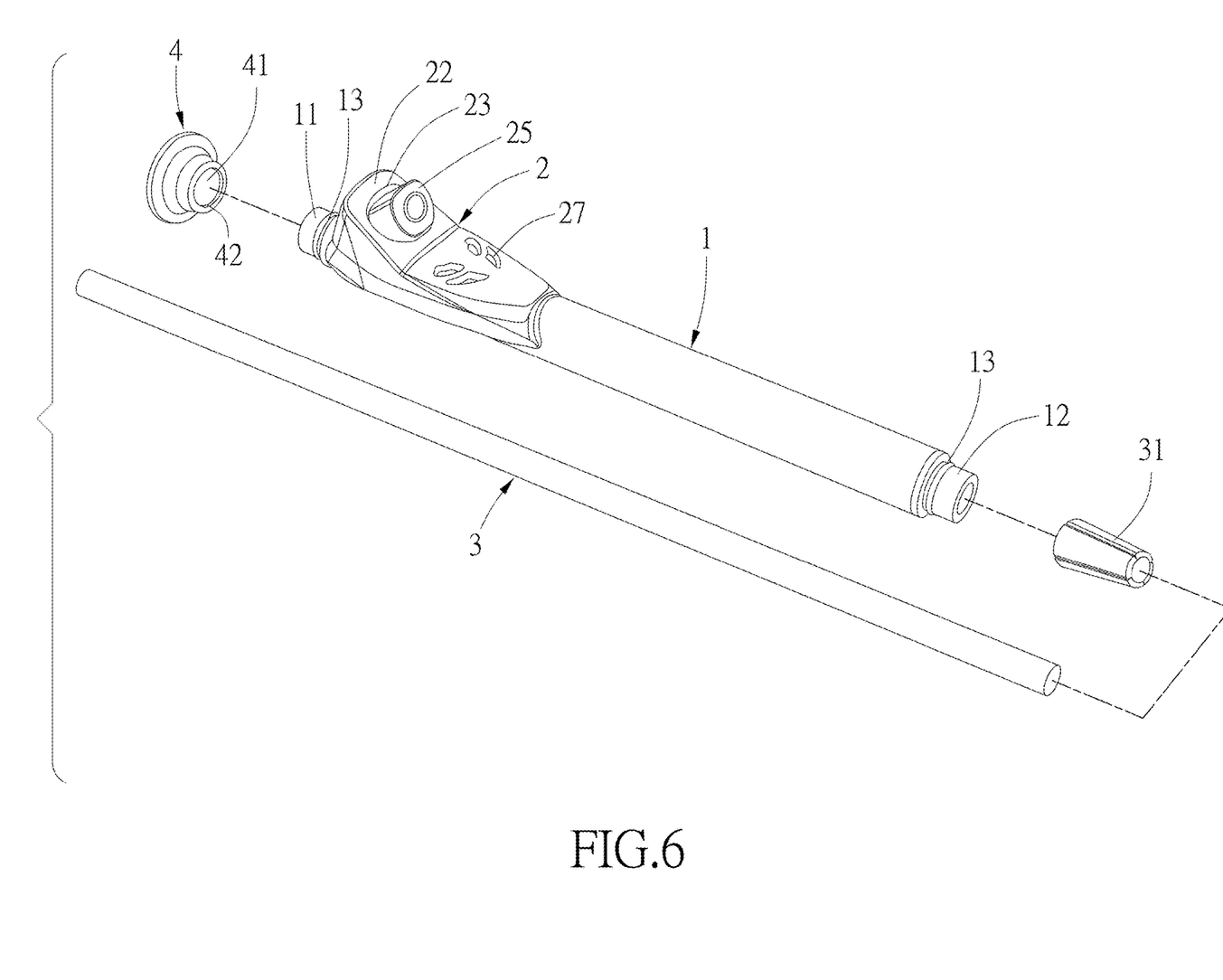
FIG. 6 is another exploded view of the present invention, wherein the crop body is to be connected to the other end of the handle.
Figure 7:
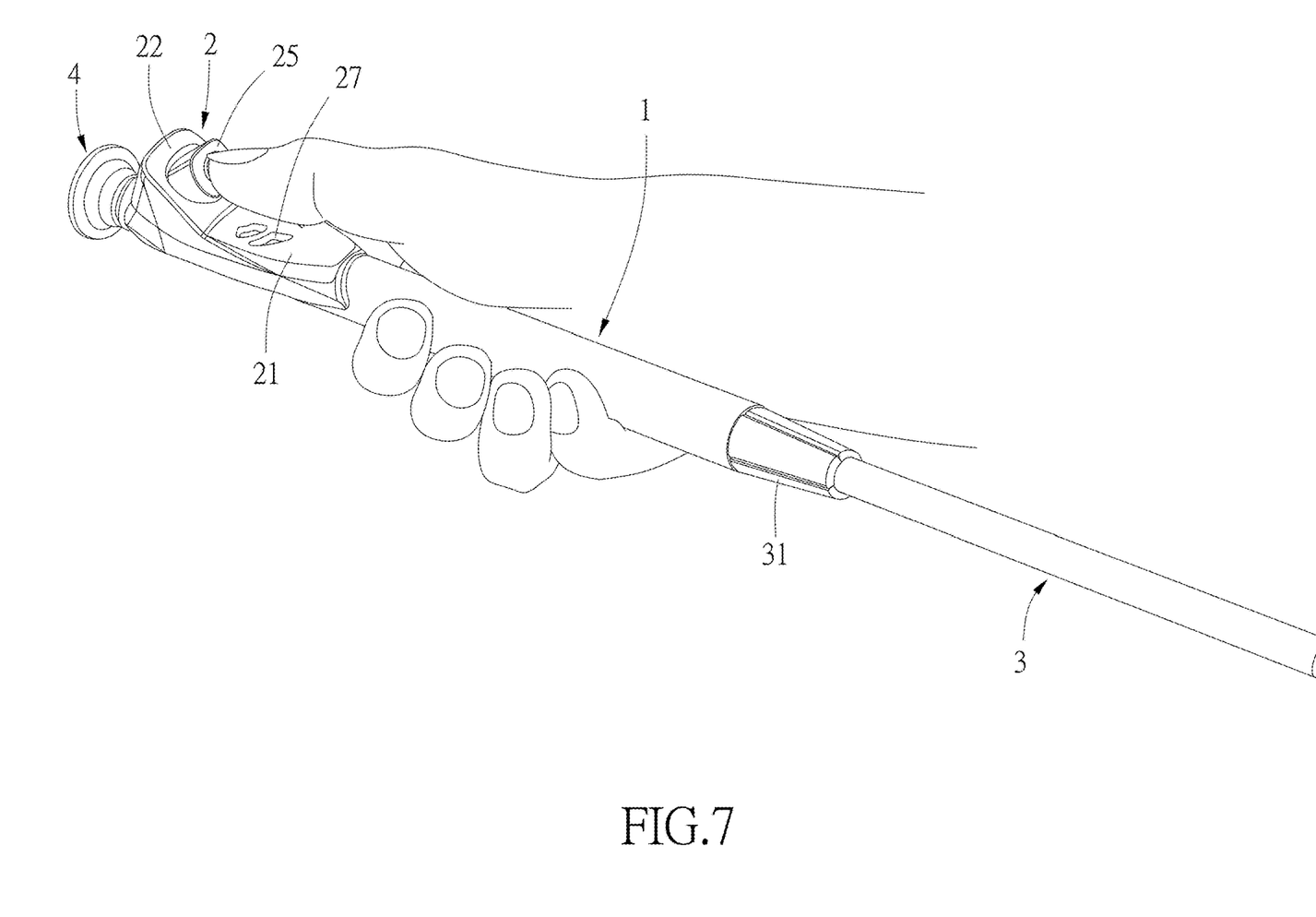
FIG. 7 is a schematic view of the present invention when in use, illustrating that the user holds the clicker training riding crop in the rearward direction.

As shown in FIG. 6 and FIG. 7, when the fitting member 31 of the crop body 3 is selectively connected to the second end opening 12 of the handle 1 and the first end opening 11 is covered by the end cap 4, the user holds the clicker training riding crop in the rearward direction. In this use mode, the user holds the handle 1 with his/her palm in the same manner, and her/his thumb still can directly press the push-button 25 for the elastic plate 24 to deform and produce a sound. The clicker training riding crop provided by the present invention can be used in the forward or rearward direction for training the horse and produce the same training sound so it is very practical.

Figure 8:
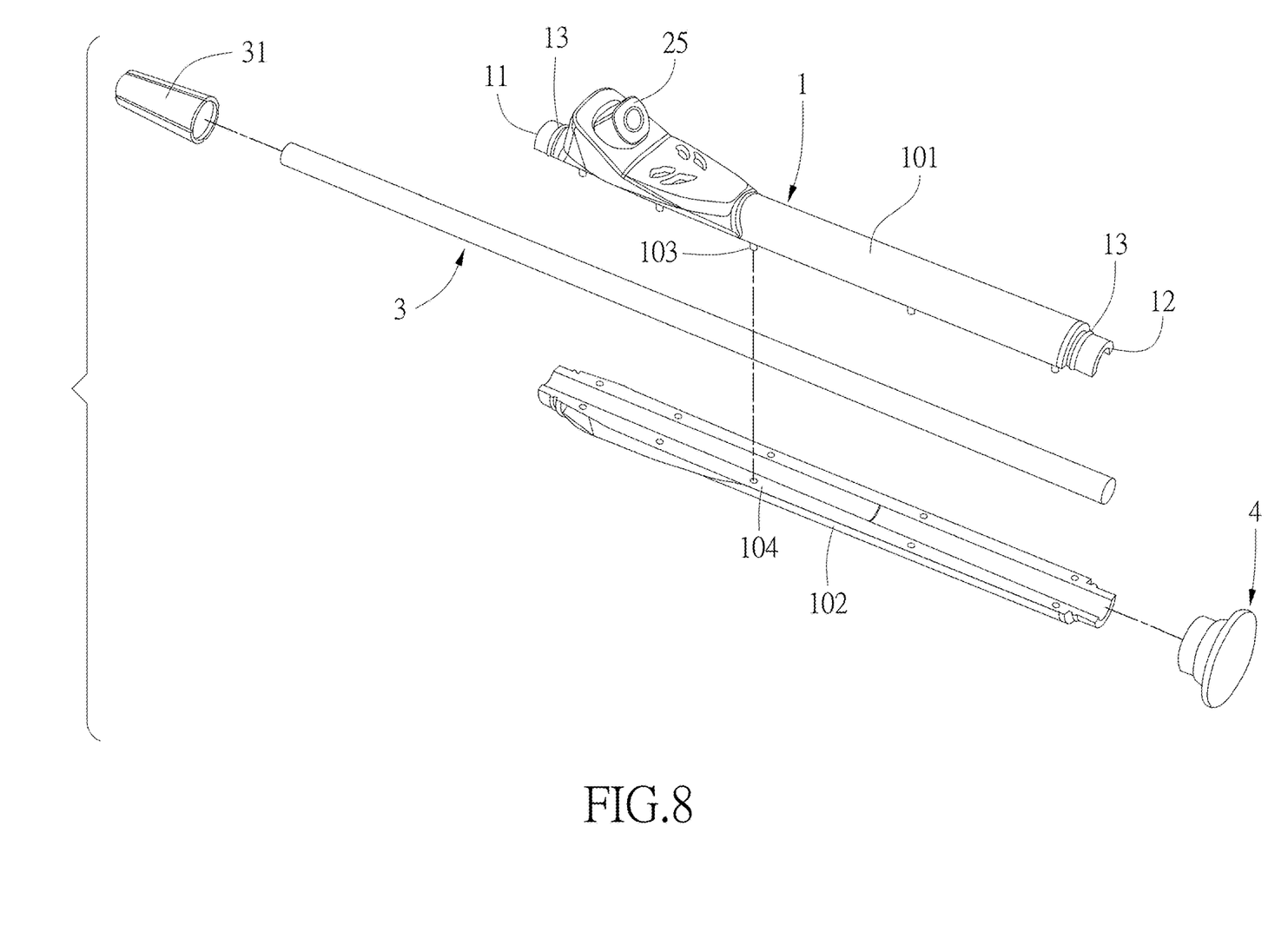
FIG. 8 is an exploded view according to another embodiment of the present invention.

FIG. 8 illustrates a second embodiment of the present invention, which is substantially similar to the first embodiment with the exceptions described below. The handle 1 is composed of an upper half housing 101 and a lower half housing 102 extending axially. The upper half housing 101 and the lower half housing 102 are assembled to form the handle 1 in the form of a long hollow rod having a first end opening 11 and a second end opening 12 at two opposite ends thereof. A locking portion 13 is annularly disposed on the outer wall of each of the first end opening 11 and the second end opening 12. In the second embodiment, connecting posts 103 and corresponding connecting holes 104 are disposed on the connecting surfaces of the upper half housing 101 and the lower half housing 102, so that the upper half housing 101 and the lower half housing 102 are assembled together through the connecting posts 103 and the connecting holes 104. After the upper half housing 101 and the lower half housing 102 sandwich the crop body 3, the fitting member 31 is then connected to the locking portion 13 of the first end opening 11. (The clicker training riding crop is used in the forward direction.) The assembly of the clicker training riding crop provided by the present invention can be completed simply and quickly.

Figure 9:
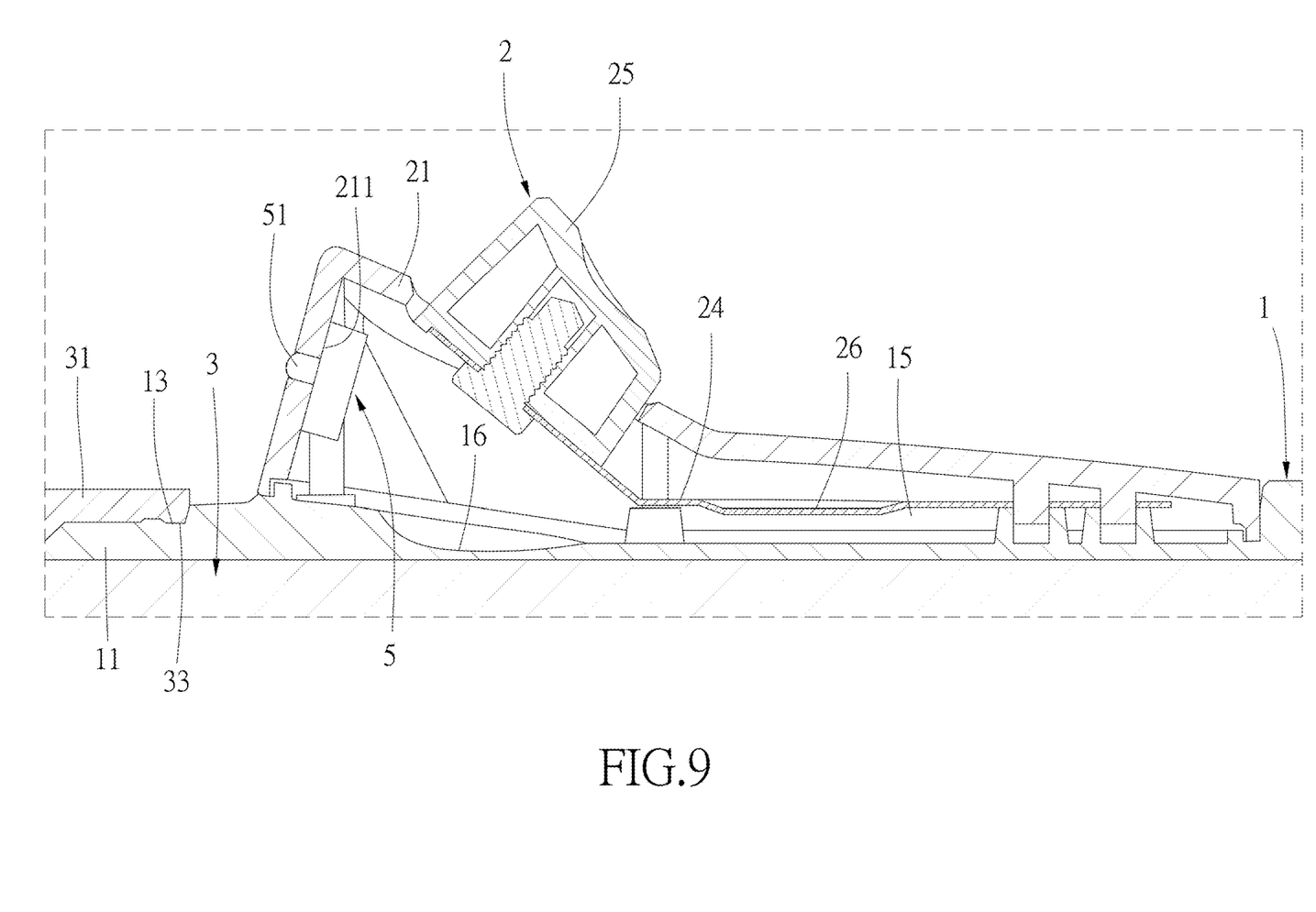
FIG. 9 is a sectional schematic view of the present invention in actual application.

As shown in FIG. 9, the clicker training riding crop provided by the present invention further comprises an electronic component 5 on an inner wall 211 of the upper cover 21 facing the first end opening 11. The electronic component 5 may be a component with specific functions, such as an LED panel or a buzzer. As shown in FIG. 9, the electronic component 5 is an LED panel as an example. The LED 51 on the LED panel passes through the inner wall 211 of the upper cover 21, such that the clicker training riding crop provided by the present invention has a lighting function.

What is claimed is:

1. A clicker training riding crop, comprising:
   a handle, in the form of a long rod having a first end opening and a second end opening at two opposite ends thereof, the first end opening and the second end opening each having a locking portion, the handle having a mounting seat close to the first end opening, a holding portion being disposed on top of the mounting seat;
   a clicker assembly, including an upper cover configured for covering the mounting seat, an elastic plate being provided in the upper cover, one end of the elastic plate being sandwiched between the upper cover and the mounting seat, a push-button being coupled to another end of the elastic plate, the push-button extending out of the upper cover from an opening of the upper cover, the elastic plate having a deformation region that is deformable and capable of emitting sound, a peripheral edge of the deformation region resting against the holding portion;
   a crop body, having a fitting member on one end of the crop body, the fitting member being lockable with the locking portion, the crop body being selectively connected to the locking portion of one of the first end opening and the second end opening through the fitting member.

2. The clicker training riding crop as claimed in claim 1, wherein the locking portion is annularly disposed on an outer wall of each of the first end opening and the second end opening, the fitting member is in the form of a fitting sleeve and has a fitting opening, a first retaining portion is disposed on an inner edge of the fitting opening corresponding to the locking portion, and the first retaining portion is in snap-fit with the locking portion, so that the crop body is selectively connected to the locking portion of one of the first end opening and the second end opening through the fitting member.

3. The clicker training riding crop as claimed in claim 2, wherein an end cap is provided on one of the first end opening and the second end, not connected to the fitting member, the end cap has a cap opening, a second retaining portion is disposed on an inner edge of the cap opening corresponding to the locking portion, and the second retaining portion is in snap-fit with the locking portion.

4. The clicker training riding crop as claimed in claim 1, wherein the handle is hollow, the fitting member is in the form of a fitting sleeve and has a fitting opening, the crop body passes through the fitting member via the fitting opening, and the end of the crop body, facing the handle, is inserted into an interior of the handle.

5. The clicker training riding crop as claimed in claim 1, wherein the upper cover has a slope located close to the first end opening and extending upwardly toward the first end opening, the opening is defined in the slope, a concave portion is formed on a top of the mounting seat corresponding in position to the opening, and the push-button extends out of the slope of the upper cover from the opening of the upper cover.

6. The clicker training riding crop as claimed in claim 5, wherein the elastic plate is made of a material with resilient elasticity and is integrally formed by bending so that the elastic plate has a flat section and an inclined section extending upwardly relative to the flat section, one end of the flat section is sandwiched between the upper cover and the mounting seat, the deformation region is formed on the flat section, and the push-button is coupled to one end of the inclined section.

7. The clicker training riding crop as claimed in claim 6, wherein the inclined section of the elastic plate has an elevation angle greater than that of the slope of the upper cover.

8. The clicker training riding crop as claimed in claim 6, wherein the deformation region is concave downward, and an outer periphery of the deformation region rests against the holding portion in the form of a U-shaped rib.

9. The clicker training riding crop as claimed in claim 6, wherein the deformation region has a first deformation portion and a second deformation portion, the first deformation portion and the second deformation portion are concave downward relative to the flat section, the first deformation portion and the second deformation portion are circular and arranged concentrically, a height difference is defined between the first deformation portion and the second deformation portion, the first deformation portion is gradually inclined downward, and a bottom of the first deformation portion is connected to the second deformation portion that is planar.

10. The clicker training riding crop as claimed in claim 1, wherein a top of the upper cover is formed with at least one sound hole corresponding in position to the deformation region.

11. The clicker training riding crop as claimed in claim 1, wherein the handle is composed of an upper half housing and a lower half housing extending axially, and the upper half housing and the lower half housing are assembled to form the handle.

12. The clicker training riding crop as claimed in claim 1, wherein an electronic component is provided on an inner wall of the upper cover facing the first end opening, and the electronic component is one of an LED (light-emitting diode) panel and a buzzer.

\* \* \* \* \*